United States Patent
Yoshizawa

(10) Patent No.: US 9,661,124 B2
(45) Date of Patent: May 23, 2017

(54) COMMUNICATION DEVICE, COMMUNICATION CONTROL DEVICE, PROGRAM, AND COMMUNICATION CONTROL METHOD

(71) Applicant: Sony Corporation, Tokyo (JP)

(72) Inventor: Atsushi Yoshizawa, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 14/422,791

(22) PCT Filed: May 22, 2013

(86) PCT No.: PCT/JP2013/064247
§ 371 (c)(1),
(2) Date: Feb. 20, 2015

(87) PCT Pub. No.: WO2014/034196
PCT Pub. Date: Mar. 6, 2014

(65) Prior Publication Data
US 2015/0229753 A1 Aug. 13, 2015

(30) Foreign Application Priority Data

Aug. 29, 2012 (JP) ................................. 2012-188744

(51) Int. Cl.
*H04M 1/725* (2006.01)
*H04W 36/00* (2009.01)
(Continued)

(52) U.S. Cl.
CPC ........ *H04M 1/72563* (2013.01); *H04L 67/36* (2013.01); *H04M 1/72522* (2013.01);
(Continued)

(58) Field of Classification Search
None
See application file for complete search history.

(56) References Cited

U.S. PATENT DOCUMENTS

2008/0198811 A1* 8/2008 Deshpande ........... H04W 48/16
370/332
2010/0278119 A1 11/2010 Potkonjak
(Continued)

FOREIGN PATENT DOCUMENTS

JP 2002-199438 A 7/2002
JP 2008-288973 A 11/2008
(Continued)

OTHER PUBLICATIONS

Supplementary European Search Report received for European patent application No. 13833138.4, mailed on Mar. 15, 2016, p. 15.

*Primary Examiner* — Leon-Viet Nguyen
(74) *Attorney, Agent, or Firm* — Chip Law Group

(57) ABSTRACT

There is provided a communication device including a display control unit configured to, in a case where information on a plurality of parameters is provided, use the provided information and control display of a screen for deciding values of the plurality of parameters, the plurality of parameters each indicating user's request with respect to a radio communication service and depending on each other, and an acquisition unit configured to acquire the decided values of the plurality of parameters. The acquired values of the plurality of parameters are used for changing control of the radio communication service.

16 Claims, 10 Drawing Sheets

(51) Int. Cl.
*H04L 29/08* (2006.01)
*H04W 4/00* (2009.01)
*H04W 8/18* (2009.01)

(52) U.S. Cl.
CPC ............ *H04W 4/001* (2013.01); *H04W 8/18* (2013.01); *H04W 36/0055* (2013.01)

(56) References Cited

U.S. PATENT DOCUMENTS

| | | | | |
|---|---|---|---|---|
| 2010/0304730 A1* | 12/2010 | Huang | ............... | H04M 1/72572 455/419 |
| 2012/0224474 A1* | 9/2012 | Beser | .................... | H04W 40/02 370/228 |
| 2015/0045011 A1* | 2/2015 | Nakamura | ........ | H04W 52/0274 455/418 |

FOREIGN PATENT DOCUMENTS

| | | | | |
|---|---|---|---|---|
| JP | 2009-170981 A | | 7/2009 | |
| JP | 2009170981 | * | 7/2009 | ............ H04W 52/02 |
| JP | 2010-193456 A | | 9/2010 | |
| WO | 2008-044877 A | | 4/2008 | |
| WO | 2008-111684 A | | 9/2008 | |

* cited by examiner

COMMUNICATION DEVICE, COMMUNICATION CONTROL DEVICE, PROGRAM, AND COMMUNICATION CONTROL METHOD

TECHNICAL FIELD

The present disclosure relates to a communication device, a communication control device, a program, and a communication control method.

BACKGROUND ART

At present, radio communication schemes such as Long-Term Evolution (LTE) have been standardized by the Third Generation Partnership Project (3GPP), and radio communication systems compliant with such radio communication schemes have been introduced. In such radio communication systems, a terminal device performs radio communication with a base station via a radio access network (RAN).

In the RAN, various kinds of control are performed such as control of radio resource, and control of handover. Such RAN control or optimization thereof is performed at a network side including the base station. The terminal device has an auxiliary role for the base station to perform the RAN control or the optimization thereof, such as measurement of reception power level.

For example, Patent Literature 1 discloses a technology by which a terminal device measures a reception power level of a neighboring cell and transmits a result of the measurement to a base station and the base station determines handover so as to control the handover.

CITATION LIST

Patent Literature

Patent Literature 1: JP 2010-193456A

SUMMARY OF INVENTION

Technical Problem

However, in technologies of the related arts including Patent Literature 1, the terminal device merely has the auxiliary role. Accordingly, any request (for example, response speed in communication) for a radio communication service may not be reflected on the radio communication service in response to an instruction from a user of the terminal device. That is, it is considered that sometimes a radio communication service that the user wants is not provided. On the other hand, even if a system by which any request (for example, response speed in communication) is reflected on the radio communication service in response to an instruction from the user is introduced, another request (for example, power consumed by communication) having a dependence relation with the above request may be affected. Subsequently, when the user does not understand the dependence relation and the another request is affected (for example, the power consumed by communication increases), it is predicted that the radio communication that the user wants is not provided.

Accordingly, it is desirable to provide a system capable of causing a user to understand that there is a dependence relation between the plurality of requests for the radio communication service and providing a radio communication service that the user wants.

Solution to Problem

According to the present disclosure, there is provided a communication device including a display control unit configured to, in a case where information on a plurality of parameters is provided, use the provided information and control display of a screen for deciding values of the plurality of parameters, the plurality of parameters each indicating user's request with respect to a radio communication service and depending on each other, and an acquisition unit configured to acquire the decided values of the plurality of parameters. The acquired values of the plurality of parameters are used for changing control of the radio communication service.

In addition, according to the present disclosure, there is provided a communication control device including an acquisition unit configured to acquire information on a plurality of parameters each indicating user's request with respect to a radio communication service and depending on each other, and a providing unit configured to provide the acquired information to a communication device that uses the information and controls display of a screen for deciding values of the plurality of parameters. The communication device acquires the decided values of the plurality of parameters. The acquired values of the plurality of parameters are used for changing control of the radio communication service.

In addition, according to the present disclosure, there is provided a communication control device including a communication unit configured to communicate with a communication device that, in a case where information on a plurality of parameters is provided, uses the provided information, controls display of a screen for deciding values of the plurality of parameters, and acquires the decided values of the plurality of parameters, the plurality of parameters each indicating user's request with respect to a radio communication service and depending on each other, and a control unit configured to execute control of the radio communication service. The acquired values of the plurality of parameters are used for changing the control of the radio communication service.

In addition, according to the present disclosure, there is provided a program for causing a computer to function as a display control unit configured to, in a case where information on a plurality of parameters is provided, use the provided information and control display of a screen for deciding values of the plurality of parameters, the plurality of parameters each indicating user's request with respect to a radio communication service and depending on each other, and an acquisition unit configured to acquire the decided values of the plurality of parameters. The acquired values of the plurality of parameters are used for changing control of the radio communication service.

In addition, according to the present disclosure, there is provided a communication control method including, in a case where information on a plurality of parameters is provided, using the provided information and controlling display of a screen for deciding values of the plurality of parameters, the plurality of parameters each indicating user's request with respect to a radio communication service and depending on each other, and acquiring the decided values of the plurality of parameters. The acquired values of the plurality of parameters are used for changing control of the radio communication service.

Advantageous Effects of Invention

As described above, according to the present disclosure, it is possible to cause a user to understand that there is a dependence relation between the plurality of requests for the radio communication service and provide a radio communication service that the user wants.

DESCRIPTION OF EMBODIMENTS

Figure 1:
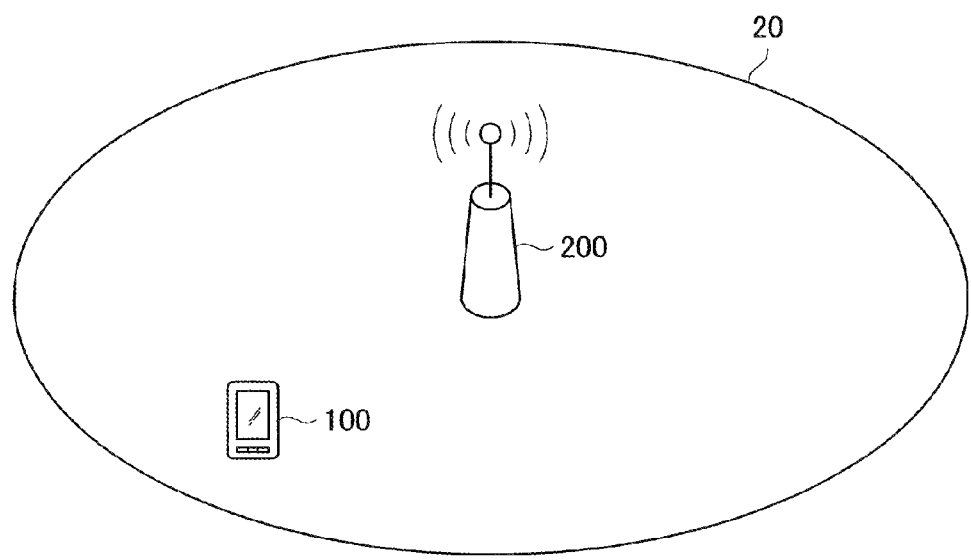
FIG. 1 is an explanatory diagram showing an example of a schematic configuration of a radio communication system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. Introduction
2. Schematic Configuration of Radio Communication System
3. Configuration of each Device
3.1. Configuration of Terminal Device
3.2. Configuration of Base Station
4. Flow of Process
5. Modification
6. Conclusion

1. INTRODUCTION

Firstly, a background art and a technical problem are explained.

(Back Ground)

At present, radio communication schemes such as LTE have been standardized by the 3GPP. In addition, radio communication systems compliant with such radio communication schemes have been introduced. In such radio communication systems, a terminal device performs radio communication with a base station via a RAN.

Smartphones have come into wide use as the terminal device. Battery driving time of the smartphones are shorter than battery driving time of past terminal devices. In general, the smartphones have large power consumption due to radio communication, while the smartphones also have large power consumption due to high-performance displays, high-performance processors, or the like. For example, since a plurality of applications in the smartphone are constantly connected to a network, control signals and data which are transmitted and received between the terminal device and the network increase. As a result, power consumption due to the radio communication increases.

Accordingly, many users change a setting of a function of the terminal device so as to reduce the power consumption (that is, so as to prolong the battery driving time). For example, a user change the setting in accordance with usage condition of the terminal device in a manner that a specific function such as a wireless local area network (WLAN) or Bluetooth (registered trademark) stops. Alternatively, for example, the user deletes an unnecessary account, service or application from the terminal device as possible.

In view of the above-described user's situation, manufacturers of such terminal devices also take countermeasures to reduce power consumption. For example, some manufacturers provides an application capable of easily setting ON/OFF of the WLAN or Bluetooth (registered trademark), or an application capable of easily deleting the unnecessary application.

Industry groups of telecommunications carriers such as the GSM (registered trademark) Association (GSMA) have made guidelines for appropriately developing applications so as to improve network congestion due to large communication by applications and improve quick drain of batteries in terminal devices. As described above, educational activities for developers of applications has been performed.

In such background, such problem of increase of control signals for RAN access or such problem of life of batteries due to the use of smartphones have already been recognized in the 3GPP at present. In addition, standardization for RAN optimization has been discussed in a session of enhancements for diverse data application which is one of the RAN Work Item.

On the other hand, at present, radio communication schemes such as Long-Term Evolution (LTE) have been standardized by the 3GPP, and radio communication systems compliant with such radio communication schemes have been introduced. In such radio communication systems, a terminal device such as a smartphone performs radio communication with a base station via a RAN.

In the RAN, various kinds of control are performed such as control of radio resource, and control of handover. Such RAN control or optimization thereof is performed at a network side including the base station. The terminal device has an auxiliary role for the base station to perform the RAN control or the optimization thereof, such as measurement of reception power level.

For example, in the past, for handover, a terminal device measures a reception signal level from an adjacent cell and reports the reception signal level to a network side, in cellular radio communication systems such as LTE. Subsequently, a network controls the handover on the basis of a result of the measurement.

As an example, JP 2010-193456A discloses a technology by which a terminal device measures a reception power level of a neighboring cell and transmits a result of the measurement to a base station and the base station determines handover so as to control the handover.

As another example, in LTE, a terminal device frequently transmits a control signal to a base station, and the base station optimizes RAN control by using such control signal. Examples of such control signal include a channel quality indicator (CQI) indicating a communication quality in a downlink channel and a buffer status report (BSR) indicating a status of a transmission buffer.

(Technical Problem)

However, in technologies of the related arts, the terminal device merely has the auxiliary role. Accordingly, any request (for example, response speed in communication) for a radio communication service may not be reflected on the radio communication service in response to an instruction from a user of the terminal device. That is, it is considered that sometimes a radio communication service that the user wants is not provided.

On the other hand, in the 3GPP, standardization of new information provided to a network by a terminal device also has been discussed. Specifically, for example, it can be considered that the terminal device provides the network with new information such as data traffic information of the terminal, setting information of the terminal device, or movement information of the terminal device. Accordingly, it may be possible for the network to perform more accurate RAN optimization than at present.

However, in view of the RAN control focusing on a network in the related art, any request (for example, response speed in communication) may not be reflected on a radio communication service in response to an instruction from a user of a terminal device. On the other hand, even if a system by which any request (for example, response speed in communication) is reflected on the radio communication service in response to an instruction from the user is introduced, another request (for example, power consumed by communication) having a dependence relation with the above request may be affected. Subsequently, when the user does not understand the dependence relation and the another request is affected (for example, the power consumed by communication increases), it is predicted that the radio communication that the user wants is not provided.

Therefore, according to the present disclosure, it is possible to cause a user to understand that there is a dependence relation between the plurality of requests for the radio communication service and provide a radio communication service that the user wants. Hereinafter, details are explained in <<2. Schematic Configuration of Radio Communication System>>, <<3. Configuration of each Device>>, and <<4. Flow of Process>>, and <<5. Modification>>.

2. SCHEMATIC CONFIGURATION OF RADIO COMMUNICATION SYSTEM

With reference to FIG. 1, a schematic configuration of a radio communication system according to an embodiment of the present disclosure is explained. FIG. 1 is an explanatory diagram showing an example of a schematic configuration of a radio communication system according to the embodiment. With reference to FIG. 1, the radio communication system includes a terminal device 100 and a base station 200.

In a case where the terminal device 100 is located in a cell 20, the terminal device 100 performs radio communication with the base station 200 that provides a radio communication service in the cell 20. The terminal device 100 receives a control signal and data from the base station 200, and transmits a control signal and data to the base station 200. In addition, for example, the terminal device 100 displays, on a display screen, a screen to be provided to a user of the terminal device 100. In addition, for example, the terminal device 100 performs a variety of processes in response to an operation performed by the user.

In the cell 20 in which the radio communication service is provided, the base station 200 performs radio communication with one or more terminal devices 100 located in the cell 20. The base station 200 transmits a control signal and data to the terminal device 100, and receives a control signal and data from the terminal device 100. In addition, for example, the base station 200 controls the radio communication service.

Hereinafter, details of the embodiment are explained in <<3. Configuration of each Device>> and <<4. Flow of Process>>.

3. CONFIGURATION OF EACH DEVICE

Next, with reference to FIGS. 2 to 7, detailed configurations of the terminal device 100 and the base station 200 according to an embodiment of the present disclosure are explained.

<3.1. Configuration of Terminal Device>

Figure 2:
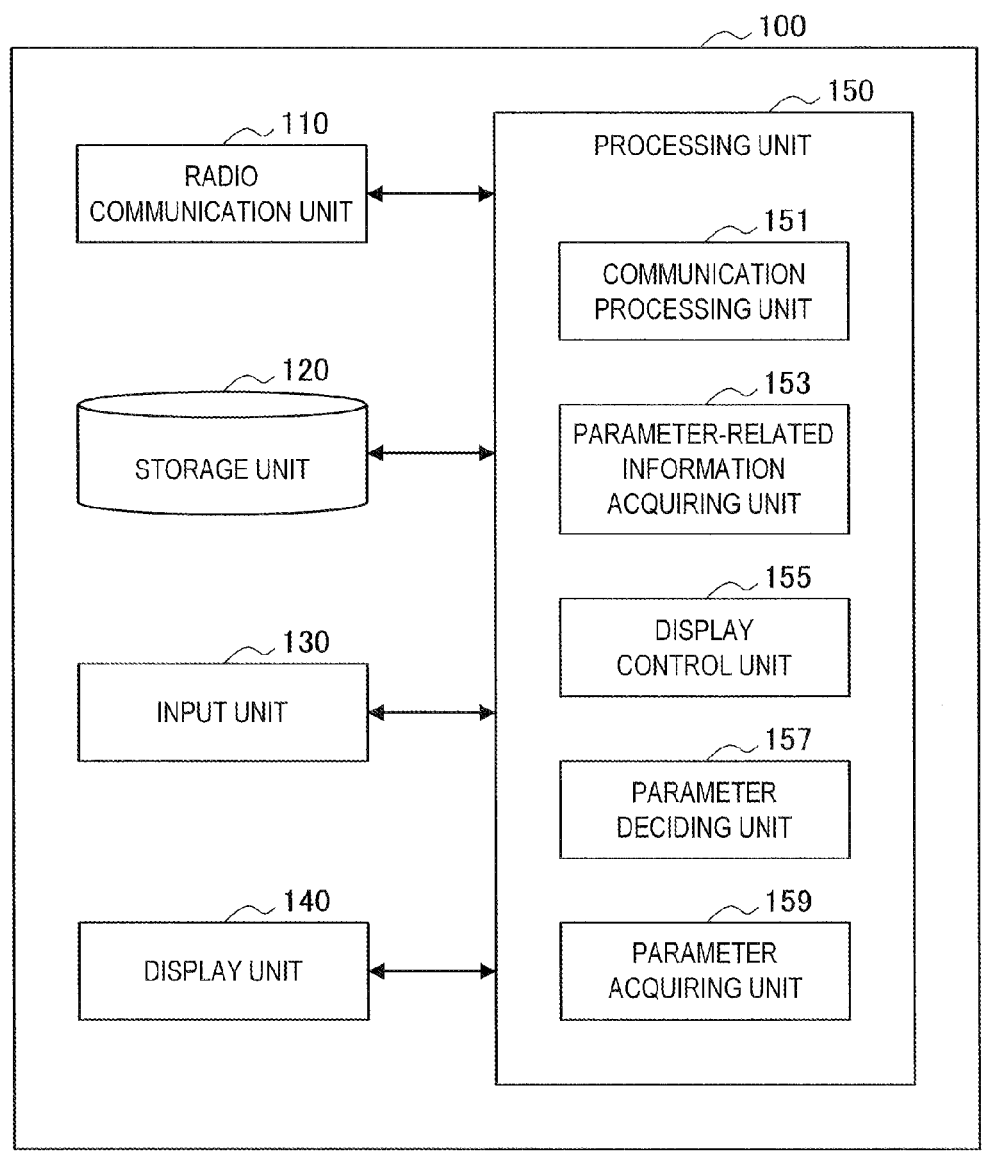
FIG. 2 is a block diagram showing an example of a configuration of a terminal device according to an embodiment.

With reference to FIGS. 2 to 5, an example of a configuration of the terminal device 100 according to the embodiment is explained. FIG. 2 is a block diagram showing the example of the configuration of the terminal device 100 according to the embodiment. With reference to FIG. 2, the terminal device 100 includes a radio communication unit 110, a storage unit 120, an input unit 130, a display unit 140, and a processing unit 150.

(Radio Communication Unit 110)

The radio communication unit 110 performs radio communication with the base station 200 in the cell 20. For example, the radio communication unit 110 includes an antenna and an RF circuit, and serves a function of physical layer in radio communication. For example, the radio communication unit 110 transmits a control signal and data to the base station 200, and receives a control signal and data from the base station 200.

(Storage Unit 120)

The storage unit 120 stores a program and data for the terminal device 100 to be operated. For example, the storage unit 120 includes a storage medium such as a hard disk or semiconductor memory.

(Input Unit 130)

The input unit 130 generates input information in response to an operation performed by the user of the terminal device 100. For example, the input unit 130 includes a touch detection surface of a touchscreen and generates input information in response to a touch of the user. In addition to the touch detection surface or in place of the touch detection surface, the input unit 130 may also include a keyboard, a mouse, a button, a switch, or the like.

(Display Unit 140)

The display unit 140 displays a screen in accordance with control performed by the processing unit 150 (more specifically, a display control unit 155). For example, the display unit 140 includes a display screen of the touchscreen.

(Processing Unit 150)

The processing unit 150 provides various functions of the terminal device 100. For example, the processing unit 150 corresponds to a processor such as a CPU or a DSP. The processing unit 150 executes a program stored in the storage unit 120 or another storage medium so as to provide the various functions. The processing unit 150 includes a communication processing unit 151, a parameter-related information acquiring unit 153, a display control unit 155, a parameter deciding unit 157, and a parameter acquiring unit 159.

(Communication Processing Unit 151)

The communication processing unit 151 performs various kinds of processes relating to radio communication. The communication processing unit 151 serves a function of a layer above the physical layer in radio communication. For example, the communication processing unit 151 serves a function of a media access control (MAC) layer, a radio link control (RLC) layer, or a radio resource control (RRC) layer.

For example, via the radio communication unit 110, the communication processing unit 151 transmits and receives data over user plane, and transmits and receives a control signal over control plane.

In addition, for example, the communication processing unit 151 operates the terminal device 100 in accordance with control of the radio communication service performed by the base station 200. For example, when receiving a control signal from the base station 200, the communication processing unit 151 performs setting of radio communication in accordance with the control signal. As an example, when receiving a control signal instructing to update a discontinuous reception (DRX) cycle, the communication processing unit 151 updates the DRX cycle in accordance with the control signal.

(Parameter-Related Information Acquiring Unit 153)

The parameter-related information acquiring unit 153 acquires information (hereinafter, referred to as "parameter-related information") on a plurality of parameters (hereinafter, referred to as "user parameters") each indicating user's request for a radio communication service and depending on each other.

User Parameter

For example, the plurality of user parameters include a parameter (hereinafter, referred to as "power consumption parameter") of power consumed by communication of the radio communication service and a parameter of communication quality of the radio communication service.

More specifically, for example, the power consumption parameter is a parameter of power consumed by the terminal device 100 for communication of the radio communication service. For example, in a case where the power consumption parameter has a large value, the power consumption parameter indicates that power consumed by the terminal device 100 is small. In a case where the power consumption parameter has a small value, the power consumption parameter indicates that power consumed by the terminal device 100 is large.

In addition, for example, the parameter of communication quality of the radio communication service includes a parameter (hereinafter, referred to as "response speed parameter") of response speed in the communication of the radio communication service. More specifically, for example, the response speed parameter is a parameter of speed of provision of desired data (for example, web page data) to the terminal device 100 via communication of the radio communication service. For example, in a case where the response speed parameter has a large value, the response speed parameter indicates that time necessary to provide the desired data with the terminal device 100 is short (that is, the speed is fast). In a case where the response speed parameter has a small value, the response speed parameter indicates that time necessary to provide the desired data with the terminal device 100 is long (that is, the speed is slow).

In addition, for example, the parameter of communication quality of the radio communication service includes a parameter (hereinafter, referred to as "connection maintenance parameter") of maintenance of a connection state in the communication of the radio communication service. More specifically, for example, the connection maintenance parameter is a parameter of an ability of the terminal device 100 to maintain a connection state in communication under high-speed movement. For example, in a case where the connection maintenance parameter has a large value, the connection maintenance parameter indicates that it is easy to maintain a connection state in communication under high-speed movement. In a case where the connection maintenance parameter has a small value, the connection maintenance parameter indicates that it is difficult to maintain the connection state in the communication under high-speed movement.

As described above, the plurality of user parameters include the power consumption parameter, the response speed parameter, and the connection maintenance parameter, for example.

Parameter-Related Information

For example, the parameter-related information is provided by a communication control device with respect to a radio communication service. In addition, for example, the communication control device is the base station 200 of the cell 20 of the radio communication service. After the radio communication unit 110 receives the parameter-related information transmitted from the base station 200, the parameter-related information acquiring unit 153 acquires the parameter-related information. Subsequently, the parameter-related information acquiring unit 153 causes the storage unit 120 to store the acquired parameter-related information.

For example, the parameter-related information includes information indicating respective user parameters included in the plurality of user parameters and information indicating a dependence relation between the plurality of user parameters.

For example, the information indicating respective user parameters included in the plurality of user parameters is parameter names of the respective user parameters. As described above, the plurality of user parameters include the power consumption parameter, the response speed parameter, and the connection maintenance parameter, for example. In this case, a parameter name of the power consumption parameter is "Battery", for example. In addition, a parameter name of the response speed parameter is "Response", for example. In addition, a parameter name of the connection maintenance parameter is "Connectivity", for example.

The information indicating the dependence relation between the plurality of user parameters is a list of a combination candidate of values of the plurality of user parameters. For example, in a case where each user parameter has any value from among candidate values $\{-4, -3, -2, -1, 0, 1, 2, 3, 4\}$, the list may be represented as follows.

$$\{Battery, Connectivity, Response\} = \{(0,0,0),(1,-1,-1),(2,-2,-2),(3,-3,-3),(4,-4,-4),(3,-4,-2), \ldots (-4,4,4)\} \quad [\text{Math 1}]$$

Values of the plurality of user parameters depend on each other, and each of the values of the plurality of user parameters becomes any combination in such list.

As described above, for example, the parameter-related information includes the parameter names of respective user parameters included in the plurality of user parameters and the list of a combination candidate of the values of the plurality of user parameters.

Since the parameter-related information includes the information indicating the dependence relation between the plurality of user parameters such as the list, it can be possible to recognize the dependence relation between the plurality of user parameters from the parameter-related information. For example, there is a trade-off relation between reduction in power consumption and improvement in communication quality (for example, improvement in response speed, or improvement in a maintenance ability of a connection state) in communication. Such trade-off can be recognized from the parameter-related information. Accordingly, by using the parameter-related information, it is possible to maintain the dependence relation and change the plurality of user parameters.

In addition, since the base station 200 of the cell 20 provides parameter-related information, it is possible to provide parameter-related information of each cell 20. It is also possible to provide parameter-related information of each terminal device 100.

(Display Control Unit 155)

The display control unit 155 controls display of a screen. For example, the display control unit 155 causes the display unit 140 to display the screen.

In a case where the parameter-related information is provided, the display control unit 155 controls display of a screen (hereinafter, referred to as "parameter deciding screen") for deciding values of the plurality of user parameters, by using the provided parameter-related information. For example, as described above, in a case where the parameter-related information is provided, the parameter-related information acquiring unit 153 acquires the parameter-related information, and causes the storage unit 120 to store the acquired parameter-related information. Subsequently, the display control unit 155 causes the display unit 140 to display the parameter deciding screen by using the parameter-related information stored in the storage unit 120. As a result, a user of the terminal device 100 can adjust values of the plurality of user parameters while watching the parameter deciding screen. As described later, the values of the plurality of parameters are decided after such adjustment.

In addition, for example, the display control unit 155 controls display of the parameter deciding screen in a manner that the values of the plurality of parameters are shown. Hereinafter, with reference to FIG. 3, details of this point are explained.

Figure 3:
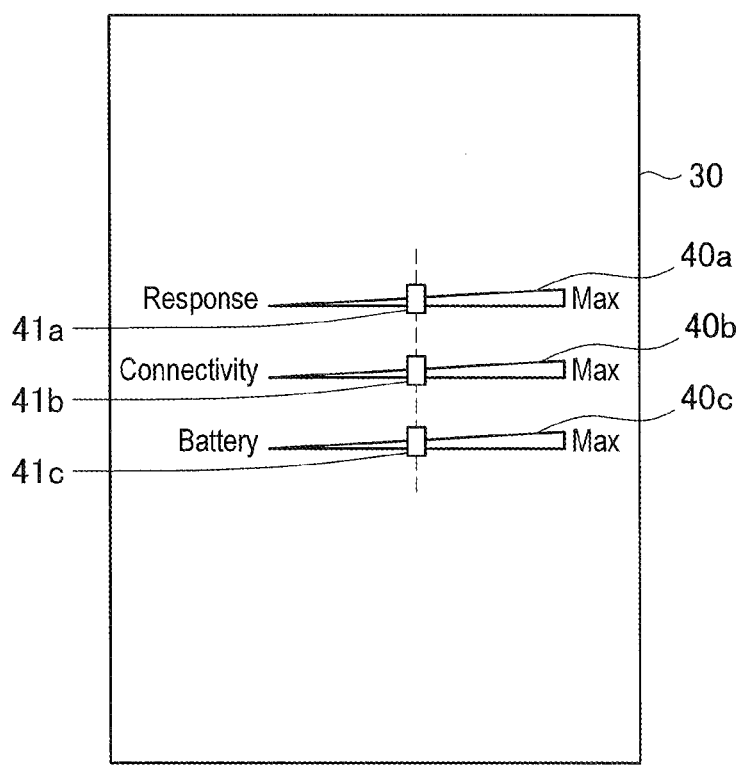
FIG. 3 is an explanatory diagram illustrating an example of a parameter deciding screen.

FIG. 3 is an explanatory diagram illustrating an example of the parameter deciding screen. FIG. 3 shows a parameter deciding screen 30. According to this example, each of the user parameters in the parameter deciding screen 30 is displayed by a slider 40 including a knob 41. Specifically, the response speed parameter is indicated by a slider 40a with a word "Response". In addition, the connection maintenance parameter is indicated by a slider 40b with a word "Connectivity". In addition, the power consumption parameter is indicated by a slider 40c with a word "Battery". Such words "Response", "Connectivity", and "Battery" are displayed so as to allow a user to easily recognize the respective user parameters. According to this example, a value of each of the user parameters is represented by position of the knob 41.

A value of a parameter shown in the parameter deciding screen is an initial value or a value calculated by the later-described parameter deciding unit 157 as necessary.

In addition, for example, the display control unit 155 controls the display of the parameter deciding screen in a manner that the displayed values of the plurality of user parameters change in response to a user operation. The displayed values of the plurality of user parameters maintain a dependence relation between the plurality of user parameters. Hereinafter, with reference to FIGS. 4 and 5, details of this point are explained.

Figure 4:
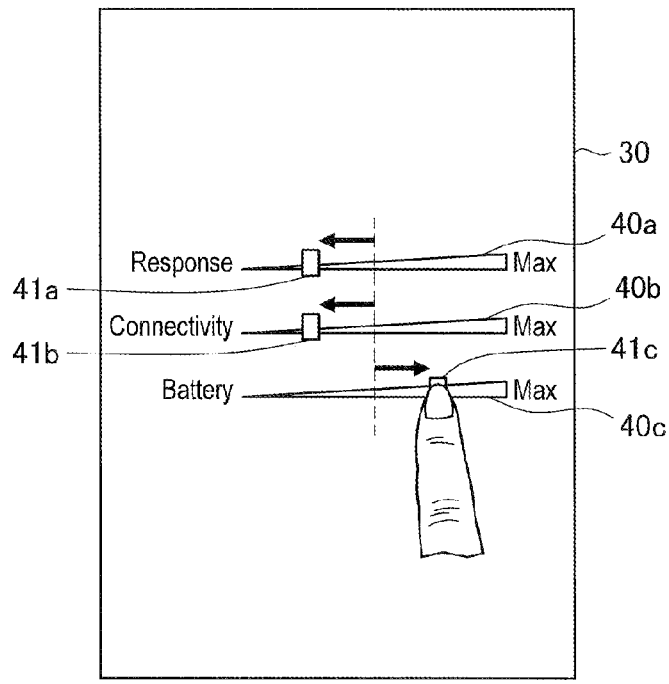
FIG. 4 is an explanatory diagram illustrating a first example of a parameter deciding screen after a user operation.

FIG. 4 is an explanatory diagram illustrating a first example of the parameter deciding screen after a user operation. FIG. 4 shows a parameter deciding screen similar to FIG. 3. For example, the input unit 130 and the display unit 140 are implemented by the touchscreen, as described above. For example, when a user of the terminal device 100 drags the knob 41b with a finger, the input unit 130 generates input information in response to the drag. Subsequently, the parameter deciding unit 157 calculates a value of the power consumption parameter according to the input information, as described later. In addition, the parameter deciding unit 157 calculates a value of the response speed parameter and a value of the connection maintenance parameter that are corresponding to the calculated value of the power consumption parameter, in a manner that the dependence relation between the plurality of user parameters are maintained. Subsequently, the display control unit 155 controls the parameter deciding screen in a manner that the knobs 41a, 41b, and 41c respectively slide to positions corresponding to the calculated value of the response speed parameter, the calculated value of the connection maintenance parameter, and the calculated value of the power consumption parameter. That is, the knob 41c is displayed in a manner that the knob 41c slides in response to drag performed by a user, and the knobs 41a and 41b are displayed in a manner that the knobs 41a and 41b slide accordingly. As a result, the values of the plurality of user parameters are displayed in a manner that the dependence relations are maintained.

Figure 5:
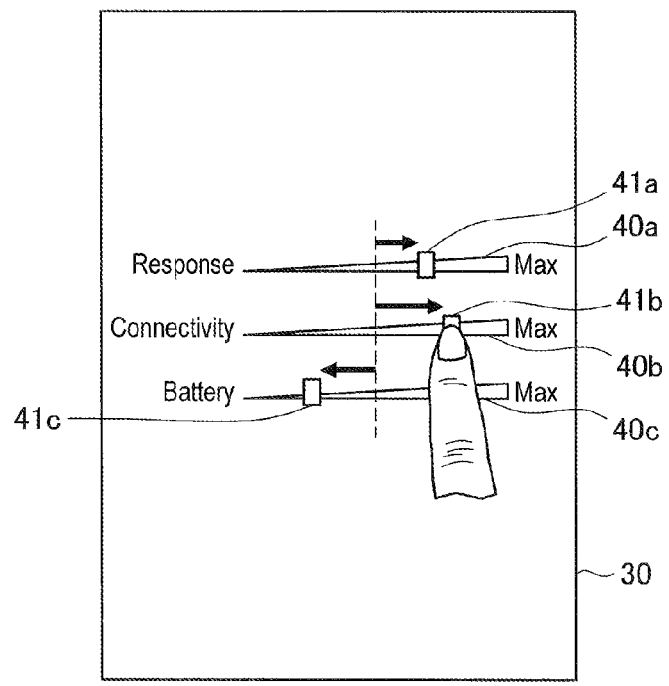
FIG. 5 is an explanatory diagram illustrating a second example of a parameter deciding screen after a user operation.

FIG. 5 is an explanatory diagram illustrating a second example of the parameter deciding screen after a user operation. FIG. 5 shows a parameter deciding screen similar to FIG. 3. For example, when a user of the terminal device 100 drags the knob 41b with a finger, the input unit 130 generates input information in response to the drag. Subsequently, the parameter deciding unit 157 calculates a value of the connection maintenance parameter according to the input information, as described later. In addition, the parameter deciding unit 157 calculates the response speed parameter and the power consumption parameter that are corresponding to the calculated value of the connection maintenance parameter, in a manner that the dependence relation between the plurality of user parameters are maintained. Subsequently, the display control unit 155 controls the parameter deciding screen in a manner that the knobs 41a, 41b, and 41 respectively slide to positions corresponding to the calculated value of the response speed parameter, the calculated value of the connection maintenance parameter, and the calculated value of the power consumption parameter. That is, the knob 41b is displayed in a manner that the knob 41b slides in response to drag performed by a user, and the knobs 41a and 41c are displayed in a manner that the knobs 41a and 41c slide accordingly. As a result, the values of the plurality of user parameters are displayed in a manner that the dependence relations are maintained.

As described above, a value of each user parameter is not individually decided in the parameter deciding screen. However, values of the plurality of parameters are decided. Accordingly, the user can understand that there is a dependence relation between the plurality of user parameters (that is, there is a dependence relation between the plurality of requests for the radio communication service). For example, the user can understand that there is a trade-off relation between power consumption in communication and communication quality such as maintenance of response speed and a connection state in the communication. Accordingly, the user can adjust the plurality of user parameters while understanding the dependence relation between the plurality of user parameters. That is, the user can understand a dependence relation between user's requests (for example, power consumption, response speed, or maintenance of connection), and can suggest a desire within a range in which the dependence relation is maintained.

In addition, it is displayed that values of a plurality of parameters changes in response to a user operation while maintaining a dependence relation. Accordingly, the user can recognize the dependence relation between the plurality of user parameters more instinctively.

In addition, as the above example, since the plurality of user parameters include a power consumption parameter and a parameter of communication quality (for example, the response speed parameter and the connection maintenance parameter), a user of the terminal device 100 can recognize balance between the power consumption and the communication quality. Accordingly, in a case where the user wants to prolong a battery driving time, the user can desire to lower the communication quality and reduce the power consumption, for example. Alternatively, in a case where the user wants to improve the communication quality, the user can desire to increase the power consumption and raise the communication quality.

In addition, since the parameter of communication quality includes the response speed parameter, the user can desire to increase the response speed in a case where improvement of the response speed is necessary, for example, at a time of watching a web page. In addition, since the parameter of communication quality includes the connection maintenance parameter, the user can desire to increase the maintenance ability of the connection state in a case where connection is easily lost, for example, at a time of moving at high speed.

(Parameter Deciding Unit 157)

The parameter deciding unit 157 decides a value of a user parameter.

The parameter deciding unit 157 decides an initial value of the user parameter, for example.

For example, more specifically, after the parameter-related information acquiring unit 153 acquires the parameter-related information, the parameter deciding unit 157 decides initial values of the plurality of user parameters. For example, the parameter-related information includes the initial values (for example, (0, 0, 0)) of the plurality of user parameters. The parameter deciding unit 157 decides initial values included in the parameter-related information as the initial values of the plurality of user parameters. Note that, it is also possible that the parameter-related information does not include initial values of the plurality of user parameters, and the parameter deciding unit 157 independently decides the initial values of the plurality of user parameters. For example, the parameter deciding unit 157 may decide medians of respective values which can be taken by the plurality of user parameters, as initial values of the plurality of user parameters. Alternatively, the parameter deciding unit 157 may decide initial values of the plurality of user parameters in accordance with a predetermined procedure.

For example, in a case where a parameter deciding screen is displayed, the parameter deciding unit 157 calculates and decides values of the plurality of user parameters in response to a user operation.

More specifically, as explained with reference to FIG. 4, for example, when a user of the terminal device 100 drags the knob 41c with a finger, the input unit 130 generates input information in response to the drag. Subsequently, the parameter deciding unit 157 calculates a value of the power consumption parameter according to the input information. As an example, the parameter deciding unit 157 calculates a value corresponding to a position after the drag and selects, as the power consumption parameter, a candidate value closest to the calculated value from the candidate values $\{-4, -3, -2, -1, 0, 1, 2, 3, 4\}$. In addition, the parameter deciding unit 157 calculates a value of the response speed parameter and a value of the connection maintenance parameter that are corresponding to the calculated value of the power consumption parameter, in a manner that the dependence relation between the plurality of user parameters are maintained. As an example, the parameter deciding unit 157 extracts combination candidates including the calculated value of the power consumption parameter from a list of combination candidates of values of user parameters. Subsequently, the parameter deciding unit 157 selects one of the extracted combination candidates. As a result, the values of the response speed parameter and the connection maintenance parameter are values included in the selected combination candidate.

In a case where a predetermined condition is satisfied, the parameter deciding unit 157 decides values of the user parameters to be the calculated values. For example, in a case where the parameter deciding screen is displayed, the parameter deciding unit 157 decides the values of the user parameters to be calculated values when a predetermined time elapses after new values of the plurality of user parameters are calculated. Note that, the above described predetermined condition is not limited to this example. For example, the predetermined condition may be that a user operation instructs to decide values of the user parameters.

(Parameter Acquiring Unit 159)

A parameter acquiring unit 159 acquires the decided values of the plurality of user parameters. For example, when the parameter deciding unit 157 decides the values of the plurality of user parameters, the parameter acquiring unit 159 acquires the decided values of the plurality of user parameters.

The acquired values of the plurality of user parameters are transmitted to the base station 200 via the communication processing unit 151 and the radio communication unit 110, for example. For example, in a case where values of the plurality of user parameters are decided while the terminal device 100 is in idle mode, the values of the plurality of user parameters may be transmitted to the base station 200 when the terminal device 100 enters connected mode. Accordingly, power consumption in the terminal device 100 is reduced, and control signals decrease. In addition, for example, the acquired values of the plurality of user parameters may be transmitted by an existing message such as an attach request message or a tracking area update message.

The acquired values of the plurality of parameters are used for changing control of the radio communication service. Details of this point are explained in relation to a configuration of the base station 200.

<3.2. Configuration of Base Station>

Figure 6:
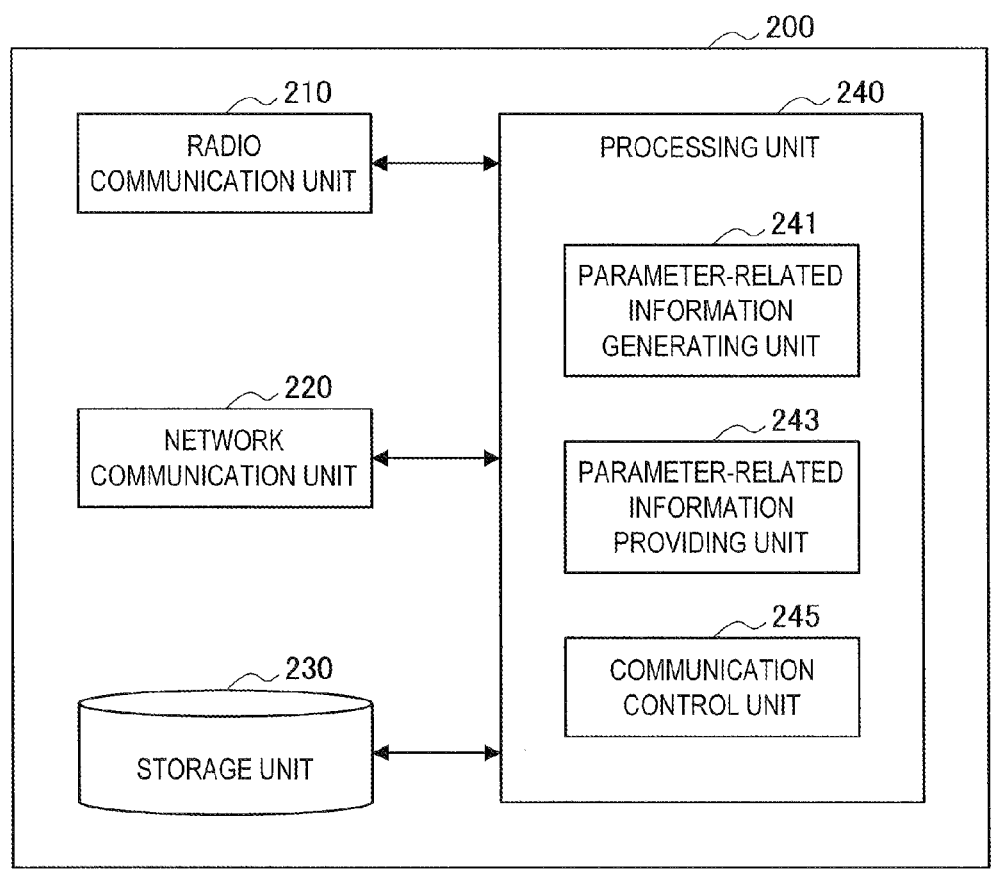
FIG. 6 is a block diagram showing an example of a configuration of a base station according to an embodiment.

With reference to FIG. 6, an example of a configuration of the base station 200 according to the embodiment is explained. FIG. 6 is a block diagram showing the example of the configuration of the base station 200 according to the embodiment. With reference to FIG. 6, the base station 200 includes a radio communication unit 210, a network communication unit 220, a storage unit 230, and a processing unit 240.

(Radio Communication Unit 210)

The radio communication unit 210 performs radio communication with the terminal device 100. That is, the radio communication unit 210 performs radio communication with one or more terminal devices 100 located in the cell 20. For example, the radio communication unit 210 includes an antenna and an RF circuit, and serves a function of physical layer in radio communication. For example, the radio communication unit 210 transmits a control signal and data to the terminal device 100, and receives a control signal and data from the terminal device 100.

(Network Communication Unit 220)

The network communication unit 220 communicates with another communication node. For example, the network communication unit 220 communicates with another base station 200, Mobility Management Entity (MME), or the like.

(Storage Unit 230)

The storage unit 230 stores a program and data for the base station 200 to be operated. For example, the storage unit 230 includes a storage medium such as a hard disk or semiconductor memory.

(Processing Unit 240)

The processing unit 240 provides various functions of the base station 200. For example, the processing unit 240 corresponds to a processor such as a CPU or a DSP. The processing unit 240 executes a program stored in the storage unit 230 or another storage medium so as to provide the various functions. The processing unit 240 includes a parameter-related information generating unit 241, a parameter-related information providing unit 243, and a communication control unit 245.

(Parameter-Related Information Generating Unit 241)

The parameter-related information generating unit 241 generates parameter-related information.

Generation of Parameter-Related Information

As described above, for example, the parameter-related information includes the parameter names of respective user parameters included in the plurality of user parameters and the list of the combination candidate of the values of the plurality of user parameters. The parameter-related information generating unit 241 generates the list of the combination candidate of the values of the plurality of user parameters.

For example, the parameter-related information generating unit 241 generates combination candidates of values of one or more system parameters that are set for controlling a radio communication service, and generates combination candidates of the plurality of user parameters corresponding to the respective combination candidates. Subsequently, the parameter-related information generating unit 241 generates the list of combination candidates of the values of the plurality of user parameters, and then generates parameter-related information. In addition, the parameter-related information generating unit 241 generates a lookup table as follows, the lookup table showing correspondence relations between the combination candidates of values of one or more system parameters and the combination candidates of the plurality of user parameters.

TABLE 1

| Combination candidate of value of system parameter | Combination candidate of value of user parameter | | |
|---|---|---|---|
| | Battery | Connectivity | Response |
| #1 | 0 | 0 | 0 |
| #2 | 1 | −1 | −1 |
| #3 | 2 | −2 | −2 |
| #4 | 3 | −3 | −3 |
| #5 | 4 | −4 | −4 |
| . | . | . | . |
| . | . | . | . |
| . | . | . | . |

By using such lookup table, it is possible to decide a value of the system parameter on the basis of the combinations of the values of the plurality of user parameters. In other words, it is possible to decide specific control on the basis of a combination of user's requests or user's desire.

Hereinafter, an example of generation of combination candidates of values of one or more system parameters, an example of generation of combination candidates of values of the plurality of user parameters corresponding to the respective combination candidates, and a specific example of the system parameters are explained.

Example of Generation of Combination Candidates of Values of One or More System Parameters First, the parameter-related information generating unit 241 acquires combinations of values (hereinafter, referred to as "criterion values") of system parameters, the values being used as criteria. The combinations of criterion values are combinations of values of system parameters that are set by the base station 200 as usual, regardless of the user parameters. The combinations of the criterion values may be acquired from the communication control unit 245, or may be provided by an outside of the base station 200. For example, the combination of the criterion values corresponds to #1 in a column "Combination candidate of value of system parameter" of the lookup table.

Next, the parameter-related information generating unit 241 changes respective values of one or more system parameters from the criterion values, and generates combination candidates of values of the system parameters. In a case where one of the system parameters is a DRX cycle and a criterion value of the DRX cycle is 64 ms, the parameter-related information generating unit 241 changes the value of the DRX cycle to a value that can be set by the system such as 32 ms or 128 ms. In a similar way, the parameter-related information generating unit 241 changes a value of another system parameter from a criterion value. Accordingly, the parameter-related information generating unit 241 acquires a list (hereinafter, referred to as "system parameter list") of combination candidates of values of one or more system parameters. For example, in a case where three system parameters may each have three values, a system parameter list of combination candidates of values of the three system parameters includes 27 (=3×3×3) combination candidates.

In a case where the system parameter list has an inappropriate combination candidate or a combination candidate that is not allowed by the system, the parameter-related information generating unit 241 removes such combination candidates from the system parameter list. Note that, another combination candidate may also be removed on the basis of a channel state, a user's situation, or the like.

As described above, the combination candidates of values of one or more system parameters are generated. Next, an example of generation of combination candidates of values of the plurality of user parameters corresponding to the respective combination candidates is explained.

Example of Generation of Combination Candidates of Values of Plurality of Corresponding User Parameters The respective combination candidates of values of one or more system parameters included in the system parameter list are evaluated in view of user parameter (that is, in view of user's request for a radio communication service). As an example, the respective combination candidates are evaluated in view of "Battery", "Response", and "Connectivity" that are three user parameters. That is, the respective combination candidates are evaluated in view of power consumption, response speed, and maintenance of connection state that are user's three requests. For example, an evaluation score is given to each combination candidate in view of each of the above perspectives. As an example, the evaluation score to be given is one of scales (for example, −4, −3, −2, −1, 0, 1, 2, 3, 4) of the evaluation score in which a standard evaluation score (for example, 0) fulfills a central role. In addition, for example, the standard evaluation score (Battery, Connectivity, Response)=(0, 0, 0) is given to a combination of the criterion values in the system parameter list. In addition, for example, (Battery, Connectivity, Response)=(2, −2, −2) is given to another combination candidate of values of the system parameters.

Accuracy of the evaluation score to be given is enough if a user of the terminal device 100 feels change in user's request (for example, power consumption, response speed, or maintenance of connection state).

Subsequently, the parameter-related information generating unit 241 generates combination candidates of values of the plurality of user parameters corresponding to combination candidates of values of one or more system parameters, by using the evaluation scores as the values of the user parameters, for example.

Note that, the evaluation scores may be decided from a result of a field test at some point during operation of a network, or may be decided from a result of a rigorous network simulation.

The parameter-related information generating unit 241 may update an evaluation score appropriately. For example, the parameter-related information generating unit 241 may update an evaluation score appropriately on the basis of a state of the network, latest scheduling information, or the like.

The evaluation score does not have to be used directly as a value of a user parameter. For example, an evaluation score is calculated, and then a value of a user parameter may be decided on the basis of the evaluation score.

System Parameter

The system parameter is a parameter set for controlling a radio communication service. For example, the system parameter includes a parameter set for controlling continuous reception or discontinuous reception (DRX). More specifically, for example, examples of the system parameter include a DRX cycle, an On-duration timer, an inactivity timer, and a short DRX cycle Timer.

The DRX is a mechanism for periodically stopping a receiving circuit and reducing average power consumption in a terminal device. Examples of the DRX include a short DRX and a long DRX that correspond to the continuous reception and are used when the terminal device 100 is in the connected mode, and a DRX that corresponds to paging and is used when the terminal device 100 is in the idle mode.

Hereinafter, a relation between the exemplified system parameters and the exemplified user's request (for example, power consumption, response speed, or maintenance of connection state) indicated by the user parameters is explained. First, with reference to FIG. 7, a relation between the DRX cycle and the On-duration timer and the user's request is explained.

Figure 7:
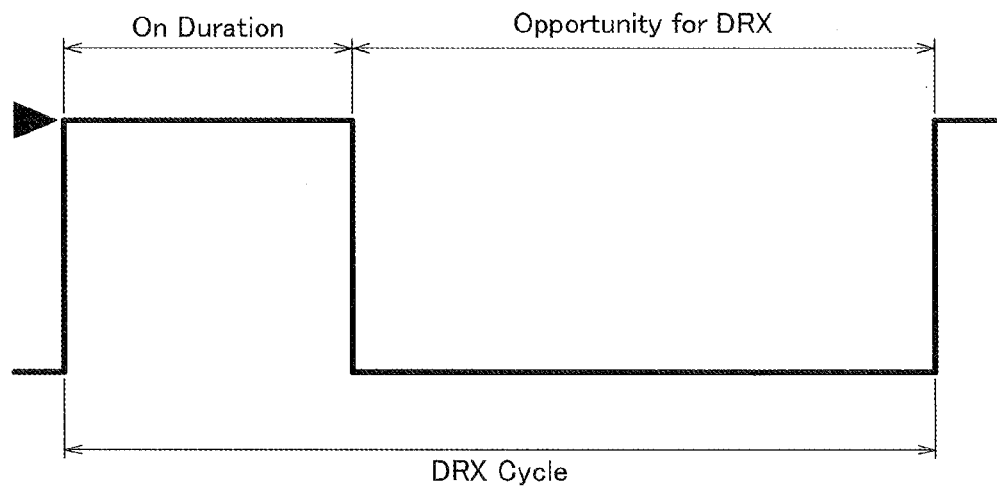
FIG. 7 is an explanatory diagram illustrating a DRX cycle and On-duration.

FIG. 7 is an explanatory diagram illustrating a DRX cycle and On-duration. FIG. 7 shows the DRX cycle and the On-duration. In the DRX, such DRX cycle is repeated. The terminal device 100 performs radio communication in the On-duration of the DRX cycle. The On-duration timer represents length of the On-duration.

Accordingly, when a value of the DRX cycle becomes large, power consumption in communication decreases and response speed in the communication may slow down. On the other hand, when a value of the DRX cycle becomes small, power consumption in communication increases and response speed in the communication may be accelerated.

In addition, when a value of the On-duration timer becomes large, power consumption in communication increases and response speed in the communication may be accelerated. On the other hand, when a value of the On-duration timer becomes small, power consumption in communication decreases and response speed in the communication may slow down.

AS described above, it is possible to realize user's request (for example, power consumption or response speed) indicated by the user parameters by setting the system parameters such as the DRX cycle and the On-duration timer.

Next, a relation between an inactivity timer and a short DRX cycle timer and user's request is explained.

A UE in the connected mode serving as a terminal device starts continuous reception when recognizing there is data addressed to the UE in a received control signal, in LTE. Subsequently, the UE stops the continuous reception when receiving a DRX command or when the inactivity timer expires, the inactivity timer setting an upper limit of time for the continuous reception. When the continuous reception stops, a short DRX starts. Subsequently, when a short DRX cycle timer expires, a long DRX starts. As described above, in the case of the connected mode in the LTE, the long DRX having a longer DRX cycle is basically used. However, in the case of shifting to the long DRX from the continuous reception, the short DRX having a shorter DRX cycle is also used. According to such operation, when a value of the inactivity timer becomes large, a time for single continuous reception is prolonged. When a value of the short DRX cycle timer becomes large, the short DRX having the shorter DRX cycle is used for longer period of time.

Accordingly, when a value of the inactivity timer becomes large, power consumption in communication increases and response speed in the communication may be accelerated. In addition, a possibility of reception of a control signal of handover also increases. Accordingly, a possibility of maintenance of a connection state may also increase more. On the other hand, when the inactivity timer becomes small, power consumption in communication decreases and response speed in the communication may slow down. In addition, a possibility of maintenance of a connection state may also decrease more.

In addition, when the short DRX cycle timer becomes large, power consumption in communication increases and response speed in the communication may be accelerated. On the other hand, when the short DRX cycle timer becomes small, power consumption in communication decreases and response speed in the communication may slow down.

As described above, it is possible to realize user's request (for example, power consumption, response speed, or maintenance of connection state) indicated by the user parameters by setting the system parameters such as the inactivity timer or the short DRX cycle timer.

Note that, the system parameters may further include a DRX cycle of a DRX (that is, DRX corresponding to paging) used in a case where the terminal device 100 is in the idle mode. When a value of the DRX cycle becomes large, power consumption in communication decreases and response speed in the communication may slow down. In addition, a possibility of reception of a control signal of handover also decreases. Accordingly, a possibility of maintenance of a connection state may also decrease more. On the other hand, when a value of the DRX cycle becomes small, power consumption in communication increases and response speed in the communication may be accelerated. In addition, a possibility of reception of a control signal of handover also increases. Accordingly, a possibility of maintenance of a connection state may also increase more.

(Parameter-Related Information Providing Unit 243)

The parameter-related information providing unit 243 acquires parameter-related information. Subsequently, the parameter-related information providing unit 243 provides the acquired parameter-related information. For example, the parameter-related information providing unit 243 acquires parameter-related information stored in the storage unit 230, causes the communication control unit 245 and the radio communication unit 210 to transmit the parameter-related information to the terminal device 100, and provides the parameter-related information.

The parameter-related information may be transmitted at an arbitrary timing and by an arbitrary way. For example, the parameter-related information may be transmitted in paging information or in system information.

(Communication Control Unit 245)

The communication control unit 245 performs various kinds of processes relating to radio communication. The communication control unit 245 serves a function of a layer above the physical layer in radio communication. For example, the communication control unit 245 serves a function of a MAC layer, an RLC layer, or an RRC layer.

For example, via the radio communication unit 210, the communication control unit 245 transmits and receives data over user plane, and transmits and receives a control signal over control plane.

In addition, the communication control unit 245 executes control of the radio communication service. Examples of the control of the radio communication service include allocation of radio resource to each terminal device 100, control of transmission power of each terminal device 100, and control of continuous reception or discontinuous reception (DRX).

For example, when the radio communication unit 210 and the communication control unit 245 receive a plurality of user parameters from the terminal device 100, the communication control unit 245 changes control of a radio communication service by using the plurality of user parameters. For example, the communication control unit 245 acquires a combination candidate of values of system parameters corresponding to a combination of values of the plurality of user parameters, by using the lookup table generated by the parameter-related information generating unit 241. Subsequently, the communication control unit 245 sets the system parameter to a value included in the acquired combination candidate. For example, the control of the radio communication service changes as described above.

Note that, the change in control of the radio communication service is not limited to change in a system parameter. As an example of the change in control of the radio communication service, allocation of radio resource may changes in a manner that additional radio resource is allocated to the terminal device 100 having a large value of the user parameter "Response".

In addition, the communication control unit 245 does not have to change control of the radio communication service. For example, the communication control unit 245 determines whether or not change in control is possible. In a case where the change in the control is possible, the communication control unit 245 may change the control. That is, the base station 200 can reflect a user parameter on control by best effort.

As described above, it is possible to provide a radio communication service that the user wants, by using a plurality of user parameters and changing control of a radio communication service. In a case where the control to be changed includes control of continuous reception or discontinuous reception (DRX), it is possible to coordinate power consumption and communication quality (for example, response speed in communication, or maintenance of a connection state) in the communication with user's request, as described above.

4. FLOW OF PROCESS

Next, with reference to FIGS. 8 to 12, examples of various processes according to embodiments of the present disclosure are explained.

<4.1. Provision and Acquisition of Parameter-Related Information>

Figure 8:
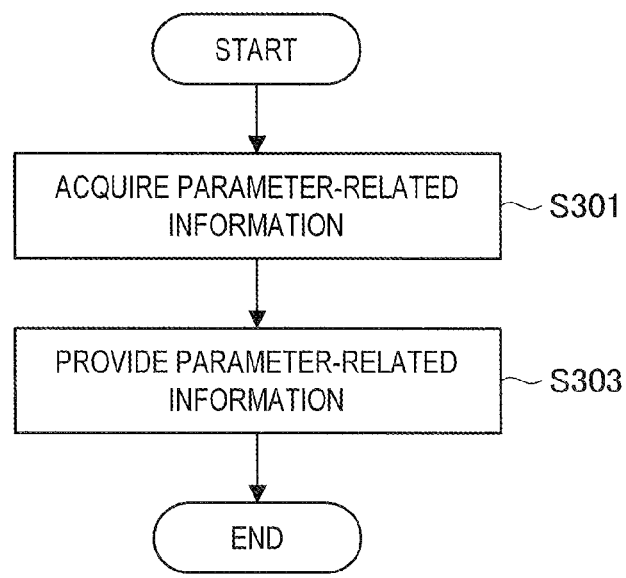
FIG. 8 is a flowchart showing an example of a schematic flow of a parameter-related information providing process according to an embodiment.
Figure 9:
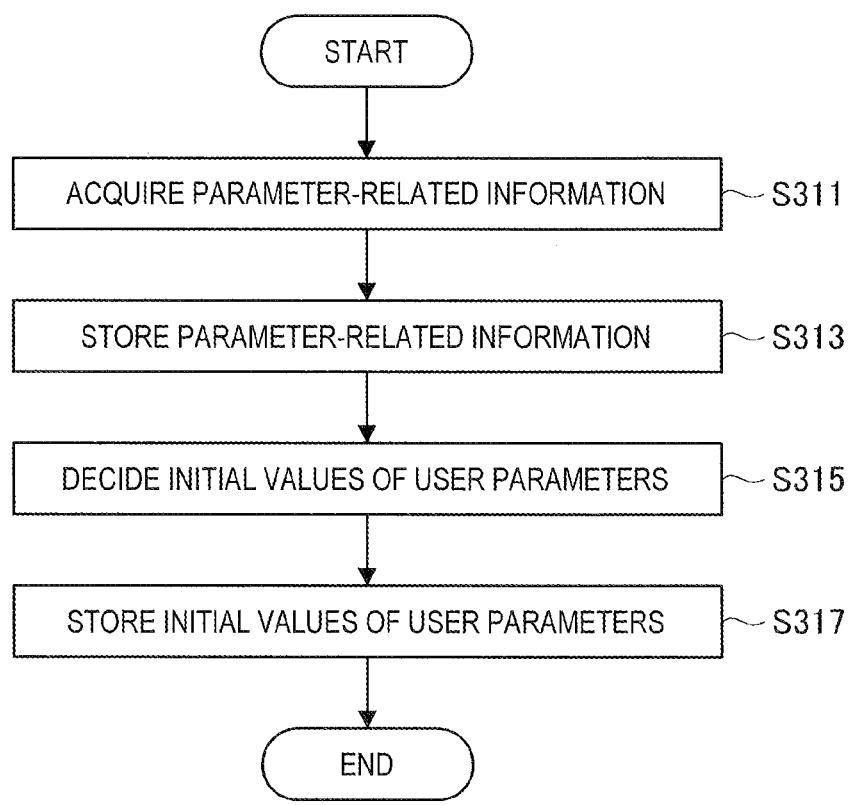
FIG. 9 is a flowchart showing an example of a schematic flow of a parameter-related information acquiring process according to an embodiment.

With reference to FIGS. 8 and 9, a parameter-related information providing process performed by the base station 200 and a parameter-related information acquiring process performed by the terminal device 100 are explained.

(Parameter-Related Information Providing Process Performed by Base Station 200)

FIG. 8 is a flowchart showing an example of a schematic flow of a parameter-related information providing process according to the embodiment. This process is performed by the base station 200.

In Step S301, the parameter-related information providing unit 243 acquires parameter-related information stored in the storage unit 230.

Next, in Step S303, the parameter-related information providing unit 243 causes the communication control unit 245 and the radio communication unit 210 to transmit the parameter-related information to the terminal device 100, and provides the parameter-related information.

(Parameter-Related Information Acquiring Process Performed by Terminal Device 100)

FIG. 9 is a flowchart showing an example of a schematic flow of a parameter-related information acquiring process according to the embodiment. This process is performed by the terminal device 100.

In Step S311, when the radio communication unit 110 and the communication processing unit 151 receives the parameter-related information transmitted from the base station 200, the parameter-related information acquiring unit 153 acquires the parameter-related information. Subsequently, in Step S313, the parameter-related information acquiring unit 153 causes the storage unit 120 to store the acquired parameter-related information.

Subsequently, in Step S315, the parameter deciding unit 157 decides initial values of a plurality of user parameters. Subsequently, in Step S317, the parameter deciding unit 157 causes the storage unit 120 to store the decided initial values of the plurality of user parameters.

<4.2. Decision of Parameter and Change in Control>

Figure 10:
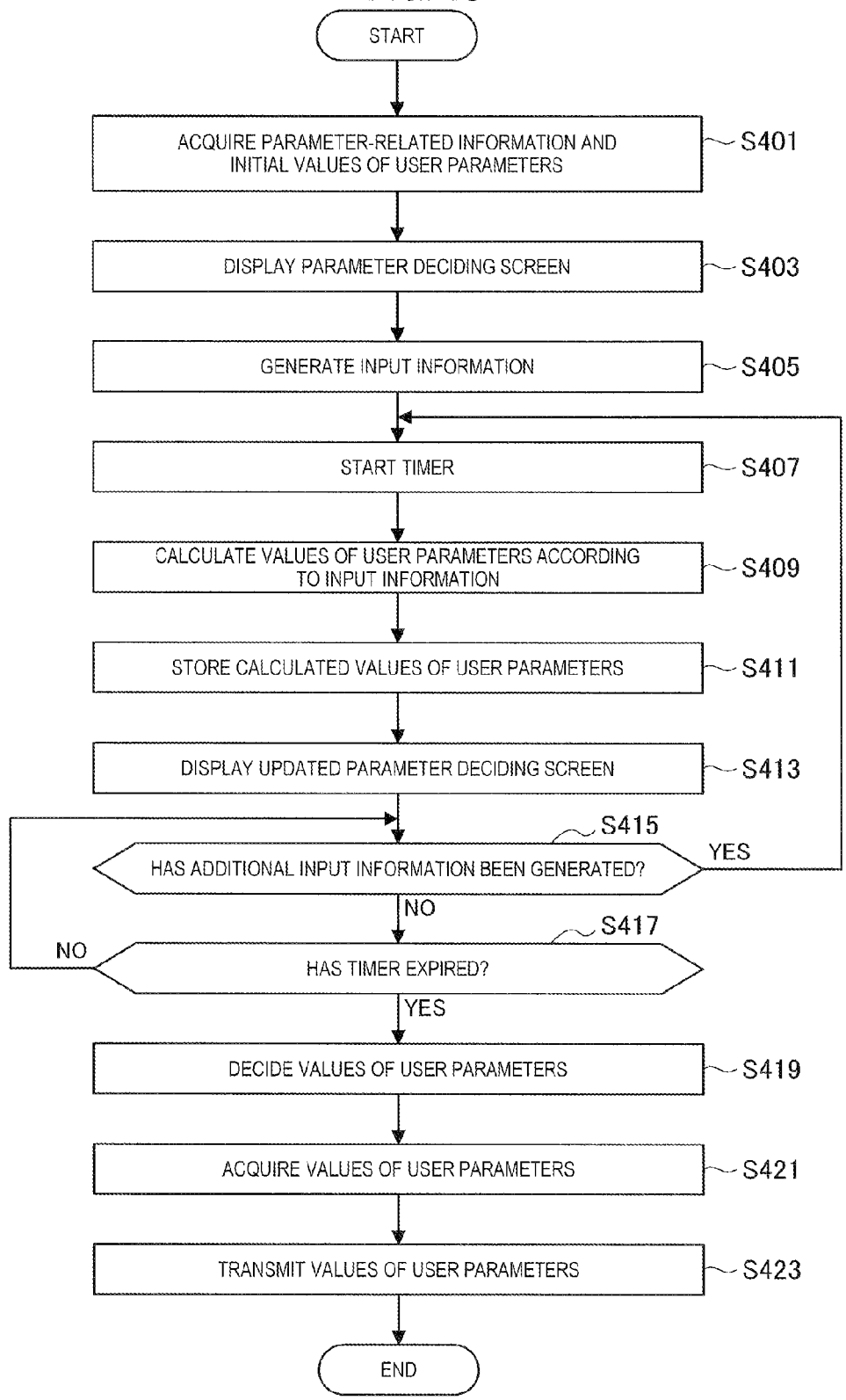
FIG. 10 is a flowchart showing an example of a schematic flow of a parameter deciding process according to an embodiment.
Figure 11:
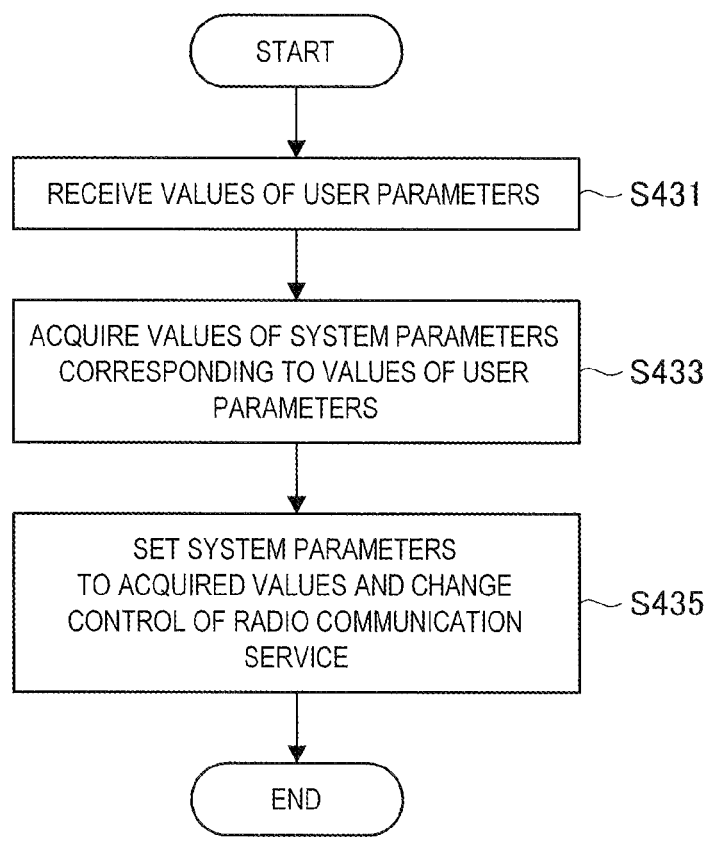
FIG. 11 is a flowchart showing an example of a schematic flow of a control change process according to an embodiment.

With reference to FIGS. 10 and 11, a parameter deciding process performed by the terminal device 100 and a control change process performed by the base station 200 are explained.

(Parameter Deciding Process Performed by Terminal Device 100)

FIG. 10 is a flowchart showing an example of a schematic flow of a parameter deciding process according to the embodiment. This process is performed by the terminal device 100.

In Step S401, the display control unit 155 acquires parameter-related information and initial values of a plurality of user parameters from the storage unit 120. Subsequently, in Step S403, the display control unit 155 causes the display unit 140 to display the parameter deciding screen.

In Step S405, the input unit 130 generates input information in response to an operation performed by a user of the terminal device 100.

In Step S407, the parameter deciding unit 157 starts a timer for deciding values of the plurality of user parameters. Subsequently, in Step S409, the parameter deciding unit 157 calculates the values of the plurality of user parameters according to the input information. Subsequently, in Step S411, the parameter deciding unit 157 causes the storage unit 120 to store the calculated values of the plurality of user parameters.

In Step S413, the display control unit 155 causes the display unit 140 to display an updated parameter deciding screen.

In Step S415, the parameter deciding unit 157 determines whether additional input information has been generated. If the additional input information has been generated, the process returns to Step S407. If not, the process proceeds to Step S417.

In Step S417, the parameter deciding unit 157 determines whether the timer has expired. If the timer has expired, the process proceeds to Step S419. If not, the process returns to Step S415.

In Step S419, the parameter deciding unit 157 decides the values of the plurality of user parameters. Subsequently, in Step S421, the parameter acquiring unit 159 acquires the decided values of the plurality of user parameters. Subsequently, in Step S423, the communication processing unit 151 and the radio communication unit 110 transmit the plurality of user parameters to the base station 200. Subsequently, the process ends.

(Control Change Process Performed by Base Station 200)

FIG. 11 is a flowchart showing an example of a schematic flow of a control change process according to the embodiment. This process is performed by the base station 200.

In Step S431, the radio communication unit 210 and the communication control unit 245 receives the values of the plurality of user parameters from the terminal device 100.

Next, in Step S433, the communication control unit 245 acquires a combination candidate of values of system parameters corresponding to a combination of the values of the plurality of user parameters, by using the lookup table generated by the parameter-related information generating unit 241.

Subsequently, in Step S435, the communication control unit 245 sets the system parameters to values included in the acquired combination candidate, and changes the control of the radio communication service.

<4.3. Generation of Parameter-Related Information>

Figure 12:
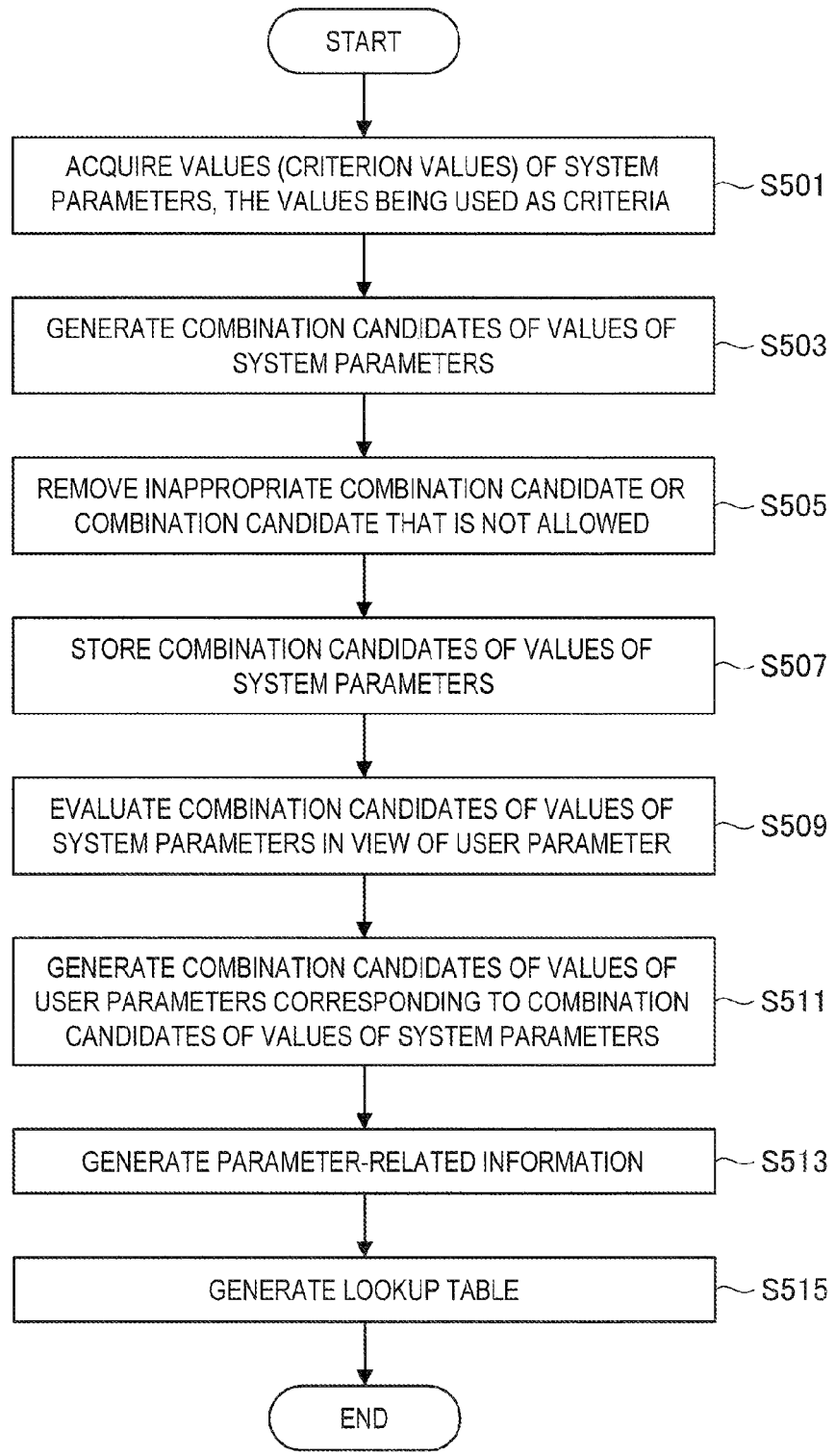
FIG. 12 is a flowchart showing an example of a schematic flow of a parameter-related information generating process according to an embodiment.

With reference to FIG. 12, a parameter-related information generating process performed by the base station 200 is explained. FIG. 12 is a flowchart showing an example of a schematic flow of the parameter-related information generating process according to the embodiment. This process is performed by the base station 200.

In Step S501, the parameter-related information generating unit 241 acquires a combination of values (hereinafter, referred to as "criterion values") of system parameters, the values being used as criteria.

Next, in Step S503, the parameter-related information generating unit 241 changes respective values of one or more system parameters from the criterion values, and generates combination candidates of values of the system parameters. That is, the parameter-related information generating unit 241 generates a list (hereinafter, referred to as "system parameter list") of the combination candidates of values of the system parameters.

Subsequently, in Step S505, in a case where the system parameter list has an inappropriate combination candidate or a combination candidate that is not allowed by the system, the parameter-related information generating unit 241 removes such combination candidates from the system parameter list.

After that, in Step S507, the parameter-related information generating unit 241 causes the storage unit 230 to store the combination candidates (system parameter list) of values of the system parameters after the removal.

Next, in Step S509, the respective combination candidates of values of system parameters are evaluated in view of user parameter (that is, in view of user's request for a radio communication service). For example, evaluation scores are given to the respective combination candidate of values of system parameters.

Subsequently, in Step S511, the parameter-related information generating unit 241 generates combination candidates of values of the plurality of user parameters corresponding to the combination candidates of values of one or more system parameters, by using the evaluation scores as the values of the user parameters.

After that, in Step S513, the parameter-related information generating unit 241 generates the list of the combination candidates of the values of the plurality of user parameters, and then generates parameter-related information.

In addition, in Step S515, the parameter-related information generating unit 241 generates a lookup table showing a correspondence relation between the combination candidates of values of one or more system parameters and the combination candidates of the plurality of user parameters.

5. MODIFICATION

Next, a first modification and a second modification of the present embodiment are explained.

<5.1. First Modification>

In the present embodiment, for example, the parameter-related information includes information indicating respective user parameters included in the plurality of user parameters and information indicating a dependence relation between the plurality of user parameters, as described above. In the first modification, the information indicating the dependence relation between the plurality of user parameters is a function representing the dependence relation between the plurality of user parameters, instead of the list of a combination candidate of values of the plurality of user parameters.

As a first example, the function representing the dependence relation between the plurality of user parameters can be as follows.

$$\text{Battery}=(\min,\max)$$

$$\text{Connectivity}=f_1(\text{Battery})$$

$$\text{Response}=f_2(\text{Battery}) \quad [\text{Math 2}]$$

According to this example, values of "Connectivity" and "Response" is calculated from functions $f_1$ and $f_2$ using "Battery" as an argument. In this case, the values of "Connectivity" and "Response" are decided in accordance with a value of "Battery". As described above, by deciding a value of a user parameter, values of the other user parameters may be decided.

As a second example, the function representing the dependence relation between the plurality of user parameters can be as follows.

$$\text{Battery}=(\min,\max)$$

$$\text{Connectivity}=(\min,\max)$$

$$\text{Response}=f_3(\text{Battery},\text{Connectivity}) \quad [\text{Math 3}]$$

According to this example, a value of "Response" is calculated from a function $f_3$ using "Battery" and "Connectivity" as arguments. As described above, by deciding values of two or more user parameters, a value of the other user parameter is decided.

As a third example, the function representing the dependence relation between the plurality of user parameters can be as follows.

$$\text{Battery}=f_4(t)$$

$$\text{Connectivity}=f_5(t)$$

$$\text{Response}=f_6(t) \quad [\text{Math 4}]$$

In this example, a single intermediate variable t is used. For example, after a value of "Battery" is decided, values of "Connectivity" and "Response" are obtained from Connectivity=$f_5(f_4^{-1}(\text{Battery}))$ and Response=$f_6(f_4^{-1}(\text{Battery}))$. As described above, by deciding a value of any one of the user parameters, values of the other user parameters are decided.

As a fourth example, the function representing the dependence relation between the plurality of user parameters can be as follows.

$$\text{Battery}=f_4(t_1,t_2)$$

$$\text{Connectivity}=f_5(t_1,t_2)$$

$$\text{Response}=f_6(t_1,t_2) \quad [\text{Math 5}]$$

In this example, two intermediate variables $t_1$ and $t_2$ are used. For example, when deciding a value of "Battery" and deciding a value of "Response", values of the intermediate variables $t_1$ and $t_2$ are decided. Accordingly, a value of "Connectivity" is also decided. As described above, it is possible to freely decide a value of each user parameter while maintaining the dependence relation.

<5.2. Second Modification>

Typically, allowable control or optimal control of a radio communication service changes depending on a state of a channel. According to the second modification, the decided values of the plurality of parameters depend on a state of a communication channel of the radio communication service. As an example, the decided values of the plurality of parameters depend on a channel quality indicator (CQI) of the communication channel of the radio communication service.

More specifically, for example, the parameter-related information includes information indicating respective user parameters included in the plurality of user parameters and information indicating a dependence relation between the plurality of user parameters, for example. The information indicating the dependence relation between the plurality of user parameters is a list of a combination candidate of values of the plurality of user parameters. For example, the parameter-related information generating unit 241 generates the list for each value of the CQI, as follows.

$$\{\text{Battery, Connectivity, Response}\}_{CQI=1} = \quad [\text{Math 6}]$$
$$\{(-2, 0, 0), (-1, -1, -1), (0, -2, -2), (1, -3, -3),$$
$$(2, -4, -4), (1, -4, -2), \ldots (-4, 2, 2)\}$$

$$\{\text{Battery, Connectivity, Response}\}_{CQI=2} =$$
$$\{(-2, 0, 0), (-1, -1, -1), (0, -2, -2), (1, -3, -3),$$
$$(2, -4, -4), (1, -4, -2), \ldots (-4, 2, 2)\}$$

$$\{\text{Battery, Connectivity, Response}\}_{CQI=3} =$$
$$\{(-1, 0, 0), (0, -1, -1), (1, -2, -2), (2, -3, -3),$$
$$(3, -4, -4), (2, -4, -2), \ldots (-4, 3, 3)\}$$

$$\{\text{Battery, Connectivity, Response}\}_{CQI=4} =$$
$$\{(-1, 0, 0), (0, -1, -1), (1, -2, -2), (2, -3, -3),$$
$$(3, -4, -4), (2, -4, -2), \ldots (-4, 3, 3)\}$$

$$\{\text{Battery, Connectivity, Response}\}_{CQI=5} =$$
$$\{(0, 0, 0), (1, -1, -1), (2, -2, -2), (2, -3, -3),$$
$$(4, -4, -4), (3, -4, -2), \ldots (-4, 4, 4)\}$$

As shown above, it is possible to present user's request that is allowable in accordance with a channel state to the user, by values of the plurality of user parameters depending on the state of the communication channel. As a result, it is possible to provide a radio communication service that the user wants, within a constraint of the channel state.

6. CONCLUSION

With reference to FIGS. 1 to 12, the embodiments according to the present disclosure have been explained. According to the embodiment of the present disclosure, in a case where the parameter-related information is provided, display of a screen (that is, parameter deciding screen) for deciding values of the plurality of user parameters is controlled by using the provided parameter-related information. In addition, the decided values of the plurality of user parameters are acquired. In addition, the acquired values of the plurality of parameters are used for changing control of the radio communication service.

In the parameter deciding screen, a value of each user parameters is not individually decided. However, values of the plurality of parameters are decided. Accordingly, the user can understand that there is a dependence relation between the plurality of user parameters (that is, there is a dependence relation between a plurality of requests for the radio communication service). For example, the user can understand that there is a trade-off relation between power consumption in communication and communication quality such as response speed and maintenance of response speed and a connection state in the communication. Accordingly, the user can adjust the plurality of user parameters while understanding the dependence relation between the plurality of user parameters. That is, the user can understand a dependence relation between user's requests (for example, power consumption, response speed, or maintenance of connection), and can suggest a desire within a range in which the dependence relation is maintained.

Subsequently, it is possible to provide a radio communication service that the user wants, by using a plurality of user parameters and changing control of a radio communication service.

That is, it is possible to cause a user to understand that there is a dependence relation between the plurality of requests for the radio communication service and provide a radio communication service that the user wants.

For example, the parameter-related information is provided by a communication control device with respect to a radio communication service. As an example, the communication control device is the base station 200 of the cell 20 of the radio communication service.

Since the base station 200 of the cell 20 provides parameter-related information, it is possible to provide parameter-related information of each cell 20. It is also possible to provide parameter-related information of each terminal device 100.

For example, the parameter-related information includes information indicating respective user parameters included in the plurality of user parameters and information indicating a dependence relation between the plurality of user parameters. As an example, the information indicating the dependence relation is a list of a combination candidate of values of the plurality of user parameters. As another example, the information indicating the dependence relation is a function representing the dependence relation between the plurality of user parameters.

Since the parameter-related information includes the information indicating the dependence relation between the plurality of user parameters, it can be possible to recognize the dependence relation between the plurality of user parameters from the parameter-related information. For example, there is a trade-off relation between reduction in power consumption and improvement in communication quality (for example, improvement in response speed, or improvement in a maintenance ability of a connection state) in communication. Such trade-off can be recognized from the parameter-related information. Accordingly, by using the parameter-related information, it is possible to change the plurality of user parameters while the dependence relation is maintained.

For example, the plurality of user parameters includes a parameter (that is, power consumption parameter) of power consumed by communication of the radio communication service and a parameter of communication quality of the radio communication service. In addition, for example, the parameter of communication quality of the radio communication service includes a parameter (that is, response speed parameter) of response speed in the communication of the radio communication service. In addition, for example, the parameter of communication quality of the radio communication service includes a parameter (that is, connection maintenance parameter) of maintenance of a connection state in the communication of the radio communication service.

As described above, since the plurality of user parameters include a power consumption parameter and a parameter of communication quality (for example, a response speed parameter and a connection maintenance parameter), a user of the terminal device 100 can recognize balance between the power consumption and the communication quality. Accordingly, for example, in a case where the user wants to prolong a battery driving time, the user can desire to lower the communication quality and reduce the power consumption. Alternatively, in a case where the user wants to improve the communication quality, the user can desire to increase the power consumption and raise the communication quality.

In addition, since the parameter of communication quality includes the response speed parameter, the user can desire to increase the response speed in a case where improvement of the response speed is necessary, for example, at a time of watching a web page. In addition, since the parameter of communication quality includes the connection maintenance parameter, the user can desire to increase the maintenance ability of the connection state in a case where connection is easily lost, for example, at a time of moving at high speed.

For example, the decided values of the plurality of parameters may depend on a state of a communication channel of the radio communication service. In addition, for example, the decided values of the plurality of parameters may depend on a channel quality indicator (CQI) of the communication channel of the radio communication service.

As described above, it is possible to present user's request that is allowable in accordance with a channel state to the user, by values of the plurality of user parameters depending on the state of the communication channel. As a result, it is possible to provide a radio communication service that the user wants, within a constraint of the channel state.

For example, the control of the radio communication service includes control of continuous reception or discontinuous reception (DRX).

When the control to be changed includes control of continuous reception or discontinuous reception (DRX), it is possible to coordinate power consumption and communication quality (for example, response speed, or maintenance of a connection state in communication) in the communication with user's request.

In addition, for example, display of the parameter deciding screen is controlled in a manner that the values of the plurality of parameters are shown. More specifically, for example, the display of the parameter deciding screen is controlled in a manner that the displayed values of the plurality of user parameters change in response to a user operation.

It is displayed that values of a plurality of parameters changes in response to a user operation while maintaining a dependence relation. Accordingly, the user can recognize the dependence relation between the plurality of user parameters more instinctively.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

For example, the parameter-related information may be provided by a communication control device other than the base station. For example, the parameter-related information may be provided by a communication control device other than the base station via the base station. Alternatively, the parameter-related information may be provided without via the base station of the radio communication service. For example, in a case where the base station is an eNodeB in LTE, the parameter-related information may be provided via an access point of a WLAN.

The change in control of the radio communication service is not limited to change in control of continuous reception or discontinuous reception (DRX). For example, the change in control of the radio communication service may be change in setting of a scheduler of radio resource. Note that, the change in control of the radio communication service is not limited to change in a system parameter, and may be change in control in a different way.

Note that, the change in control of the radio communication service does not have to be performed by the base station. For example, the terminal device generates a control signal corresponding to a user parameter and transmits the control signal to the base station so as to change the control.

In a case where the terminal device 100 performs handover, the decided values of the plurality of user parameters and/or values of one or more system parameters may be transmitted from a source base station to a target base station, or may be transmitted from a terminal device to the target base station.

In addition, respective parameters included in the plurality of user parameters are not limited to the power consumption parameter, the response speed parameter, and the connection maintenance parameter. The plurality of user parameters may include various parameters related to communication of a radio communication service. As an example, the plurality of parameters may include a single communication quality parameter representing a communication quality of a radio communication service instead of the response speed parameter and the connection maintenance parameter.

In addition, the processing steps in the communication device (for example, the terminal device) or the communication control device (for example, the base station) according to the present specification do not have to be performed in chronological order in accordance with an order shown in the flow chart. For example, the processing steps in the communication device or the communication control device may be performed in an order different from the order shown in the flow chart, or may be performed in parallel.

In addition, it is also possible to create a computer program for causing a hardware such as CPU, ROM, and RAM, which are embedded in the communication device and the communication control device, to execute functions similar to the configurations of the above-described communication device and the above-described communication control device. Moreover, it may be possible to provide a recording medium having the computer program stored therein.

Additionally, the present technology may also be configured as below.

(1)

A communication device including:

a display control unit configured to, in a case where information on a plurality of parameters is provided, use the provided information and control display of a screen for deciding values of the plurality of parameters, the plurality of parameters each indicating user's request with respect to a radio communication service and depending on each other; and an acquisition unit configured to acquire the decided values of the plurality of parameters, wherein the acquired values of the plurality of parameters are used for changing control of the radio communication service.

(2)

The communication device according to (1), wherein the information on the plurality of parameters is provided by a communication control device with respect to a radio communication service.

(3)

The communication device according to (2), wherein the communication control device is a base station of a cell of the radio communication service.

(4)

The communication device according to any one of (1) to (3), wherein the information on the plurality of parameters includes information indicating respective parameters included in the plurality of parameters and information indicating a dependence relation between the plurality of parameters.

(5)

The communication device according to (4), wherein the information indicating the dependence relation is a list of a combination candidate of the values of the plurality of parameters.

(6)

The communication device according to (4), wherein the information indicating the dependence relation is a function representing the dependence relation between the plurality of parameters.

(7)

The communication device according to any one of (1) to (6), wherein the plurality of parameters include a parameter of power consumed by communication of the radio communication service and a parameter of communication quality of the radio communication service.

(8)

The communication device according to (7), wherein the parameter of communication quality of the radio communication service includes a parameter of response speed in the communication of the radio communication service.

(9)

The communication device according to (7) or (8), wherein the parameter of communication quality of the radio communication service includes a parameter of maintenance of a connection state in the communication of the radio communication service.

(10)

The communication device according to any one of (1) to (9), wherein the decided values of the plurality of parameters depend on a state of a communication channel of the radio communication service.

(11)

The communication device according to (10), wherein the decided values of the plurality of parameters depend on a channel quality indicator of the communication channel of the radio communication service.

(12)

The communication device according to any one of (1) to (11), wherein the control of the radio communication service includes control of continuous reception or discontinuous reception.

(13)

The communication device according to any one of (1) to (12),
wherein the display control unit controls the display of the screen in a manner that the values of the plurality of parameters are shown.

(14)

The communication device according to (13),
wherein the display control unit controls the display of the screen in a manner that the displayed values of the plurality of parameters change in response to a user operation, and
wherein the displayed values of the plurality of parameters maintain a dependence relation between the plurality of parameters.

(15)

A communication control device including:
an acquisition unit configured to acquire information on a plurality of parameters each indicating user's request with respect to a radio communication service and depending on each other; and
a providing unit configured to provide the acquired information to a communication device that uses the information and controls display of a screen for deciding values of the plurality of parameters,
wherein the communication device acquires the decided values of the plurality of parameters, and
wherein the acquired values of the plurality of parameters are used for changing control of the radio communication service.

(16)

A communication control device including:
a communication unit configured to communicate with a communication device that, in a case where information on a plurality of parameters is provided, uses the provided information, controls display of a screen for deciding values of the plurality of parameters, and acquires the decided values of the plurality of parameters, the plurality of parameters each indicating user's request with respect to a radio communication service and depending on each other; and
a control unit configured to execute control of the radio communication service,
wherein the acquired values of the plurality of parameters are used for changing the control of the radio communication service.

(17)

A program for causing a computer to function as:
a display control unit configured to, in a case where information on a plurality of parameters is provided, use the provided information and control display of a screen for deciding values of the plurality of parameters, the plurality of parameters each indicating user's request with respect to a radio communication service and depending on each other; and
an acquisition unit configured to acquire the decided values of the plurality of parameters,
wherein the acquired values of the plurality of parameters are used for changing control of the radio communication service.

(18)

A communication control method including:
in a case where information on a plurality of parameters is provided, using the provided information and controlling display of a screen for deciding values of the plurality of parameters, the plurality of parameters each indicating user's request with respect to a radio communication service and depending on each other; and
acquiring the decided values of the plurality of parameters,
wherein the acquired values of the plurality of parameters are used for changing control of the radio communication service.

REFERENCE SIGNS LIST 20 cell
30 parameter deciding screen
40 slider
41 knob
100 terminal device
110 radio communication unit
120 storage unit
130 input unit
140 display unit
150 processing unit
151 communication processing unit
153 parameter-related information acquiring unit
155 display control unit
157 parameter deciding unit
159 parameter acquiring unit
200 base station
210 radio communication unit
220 network communication unit
230 storage unit
240 processing unit
241 parameter-related information generating unit
243 parameter-related information providing unit
245 communication control unit

The invention claimed is:

1. A communication device, comprising:
a display control unit configured to:
control display of a screen to determine values of a plurality of parameters based on information on the plurality of parameters provided by a base station of a radio communication service;
change values of other parameters of the plurality of parameters that have a dependence relation therebetween, based on a determination that a value of at least one of the plurality of parameters has changed based on a user operation; and
an acquisition unit configured to acquire the determined values of the plurality of parameters to change control of the radio communication service,
wherein the plurality of parameters includes:
a parameter of power consumed by a communication of the radio communication service, and
a parameter of communication quality of the radio communication service that further includes:
a parameter of maintenance of a connection state in the communication of the radio communication service, and
a parameter of response speed in the communication of the radio communication service.

2. The communication device according to claim 1, wherein the information on the plurality of parameters includes first information that indicates respective parameters included in the plurality of parameters and second information that indicates the dependence relation between the plurality of parameters.

3. The communication device according to claim 2, wherein the second information is a list of a combination candidate of the values of the plurality of parameters.

4. The communication device according to claim 2, wherein the second information is a function that represents the dependence relation between the plurality of parameters.

5. The communication device according to claim 1, wherein the determined values of the plurality of parameters depend on a state of a communication channel of the radio communication service.

6. The communication device according to claim 5, wherein the determined values of the plurality of parameters depend on a channel quality indicator of the communication channel of the radio communication service.

7. The communication device according to claim 1, wherein the control of the radio communication service includes control of continuous reception or discontinuous reception.

8. The communication device according to claim 1, wherein the display control unit is further configured to control the display of the screen in a manner that the values of the plurality of parameters are displayed.

9. The communication device according to claim 8, wherein
the display control unit is further configured to control the display of the screen in a manner that the displayed values of the plurality of parameters change based on the user operation, and
wherein the displayed values of the plurality of parameters maintain the dependence relation between the plurality of parameters based on a change in the plurality of parameters based on the user operation.

10. A base station of a radio communication service, comprising:
an acquisition unit configured to acquire information on a plurality of parameters,
wherein each parameter indicates a user's request with respect to a radio communication service, and the plurality of parameters have a dependence relation therebetween; and
a providing unit configured to provide the acquired information on the plurality of parameters to a communication device,
wherein the communication device controls display of a screen to determine values of the plurality of parameters based on the acquired information on the plurality of parameters,
wherein the communication device further changes values of other parameters of the plurality of parameters that have a dependence relation therebetween, based on a determination that a value of at least one of the plurality of parameters has changed based on the user's request,
wherein the communication device acquires the determined values of the plurality of parameters to change control of the radio communication service, and
wherein the plurality of parameters includes:
a parameter of power consumed by a communication of the radio communication service, and
a parameter of communication quality of the radio communication service that further includes:
a parameter of maintenance of a connection state in the communication of the radio communication service, and
a parameter of response speed in the communication of the radio communication service.

11. A base station of a radio communication service, comprising:
a communication unit configured to communicate with a communication device, wherein
the communication device controls display of a screen to determine values of the plurality of parameters based on information on a plurality of parameters provided by the base station, and acquires the determined values of the plurality of parameters;
changes values of other parameters of the plurality of parameters that have a dependence relation therebetween, based on a determination that a value of at least one of the plurality of parameters has changed based on a user operation; and
a control unit configured to control the radio communication service and acquire the determined values of the plurality of parameters to change the control of the radio communication service,
wherein the plurality of parameters includes:
a parameter of power consumed by a communication of the radio communication service, and
a parameter of communication quality of the radio communication service that further includes:
a parameter of maintenance of a connection state in the communication of the radio communication service, and
a parameter of response speed in the communication of the radio communication service.

12. A non-transitory computer-readable medium having stored thereon, computer-executable instructions for causing the computer to execute operations, the operations comprising:
controlling display of a screen for determining values of a plurality of parameters based on information on the plurality of parameters provided by a base station of a radio communication service;
changing values of other parameters of the plurality of parameters that have a dependence relation therebetween, based on a determination that a value of at least one of the plurality of parameters changes based on a user operation; and
acquiring the determined values of the plurality of parameters
for changing control of the radio communication service,
wherein the plurality of parameters includes:
a parameter of power consumed by a communication of the radio communication service, and
a parameter of communication quality of the radio communication service that further includes:
a parameter of maintenance of a connection state in communication of the radio communication service, and
a parameter of response speed in the communication of the radio communication service.

13. A communication control method, comprising:
controlling display of a screen for determining values of a plurality of parameters based on information on a plurality of parameters provided by a base station of a radio communication service;
changing values of other parameters of the plurality of parameters that have a dependence relation therebetween, based on a determination that a value of at least one of the plurality of parameters has changed based on a user operation; and
acquiring the determined values of the plurality of parameters for changing control of the radio communication service, wherein the plurality of parameters includes:
a parameter of power consumed by a communication of the radio communication service, and
a parameter of communication quality of the radio communication service that further includes:
a parameter of maintenance of a connection state in the communication of the radio communication service, and
a parameter of response speed in the communication of the radio communication service.

14. The communication device according to claim 1, wherein the acquired values of the plurality of parameters are transmitted to the base station to change control of the radio communication service.

15. The communication device according to claim 14, wherein a combination candidates of values of a plurality of system parameters are generated that corresponds to the transmitted plurality of parameters based on a combination of the values of the transmitted plurality of parameters.

16. The communication device according to claim 15, wherein the plurality of the system parameters comprises one or more of DRX cycle, an On-duration timer, an inactivity timer, or a short DRX cycle timer.

* * * * *